United States Patent
Coté

[11] 3,728,068
[45] Apr. 17, 1973

[54] PHOTOFLASH LAMP ARRAY HAVING FLASH-ACTUATED SWITCHES

[75] Inventor: Paul T. Coté, Cleveland Heights, Ohio

[73] Assignee: General Electric Company, Schenectady, N.Y.

[22] Filed: Dec. 9, 1971

[21] Appl. No.: 206,384

[52] U.S. Cl. ................................................ 431/95
[51] Int. Cl. .............................................. F21k 3/02
[58] Field of Search ............................... 431/93, 95

[56] References Cited

UNITED STATES PATENTS

| | | | |
|---|---|---|---|
| 3,458,270 | 7/1969 | Ganser | 431/95 |
| 3,532,931 | 10/1970 | Cote et al. | 431/95 |
| 3,666,394 | 5/1972 | Bok et al. | 431/95 |

*Primary Examiner*—Carroll B. Dority, Jr.
*Attorney*—Norman C. Fulmer et al.

[57] ABSTRACT

A photoflash lamp array having flash-actuated switches respectively associated with a plurality of the flash lamps and adapted, when the associated lamp is flashed, to connect a next lamp into the electrical flashing circuit. Resistors are respectively connected in series with the plurality of flash lamps and function to insure continued operation of the lash array in the event that a flashed lamp becomes shorted instead of the usual open-circuit condition.

10 Claims, 1 Drawing Figure

PATENTED APR 17 1973  3,728,068
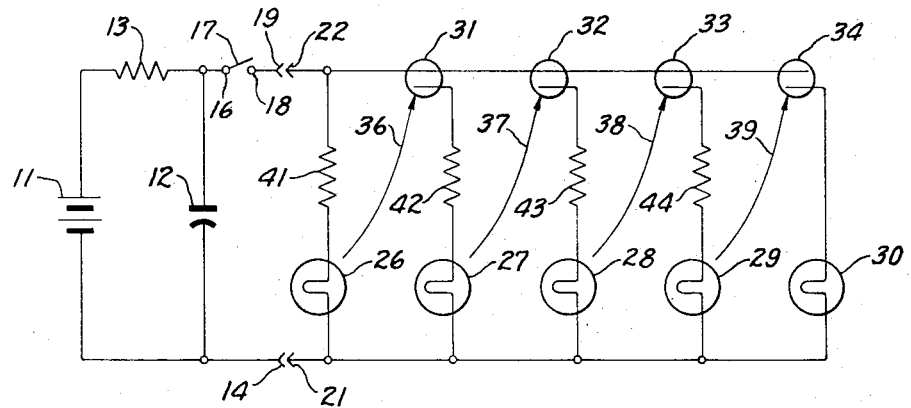
Inventor:
Paul T. Coté
by Norman C. Fulmer
His Attorney

PHOTOFLASH LAMP ARRAY HAVING FLASH-ACTUATED SWITCHES

BACKGROUND OF THE INVENTION

The invention is in the field of photoflash lamp arrays provided with flash-actuated switches (heat-sensitive or light-sensitive) for causing a different lamp to be flashed upon each occurrence of a firing pulse produced in synchronism with the opening of a camera shutter.

Numerous electronic circuits, and electromechanical switching arrangements, have been devised for causing a plurality of flash lamps to be successively flashed, one at a time, in response to firing pulses produced in synchronism with the opening of a camera shutter. The flash lamps are positioned in an array, with reflector means, for projecting light of all the flashes in the same relative direction (usually in a direction in which the camera is aimed, so as to illuminate a scene to be photographed), and therefore the flash lamp array need not be moved or rotated between pictures as is the case with so-called "flashcubes."

Various heat-responsive switching means have been proposed, for actuating switch connections in response to the heat inherently generated by flash lamps when they flash. The heat-responsive means may be a chemical or plastic material which melts, bends, moves, or deforms when heated by a flashing lamp, so as to cause switch contacts to close and electrically connect the firing pulse source to the next lamp to be flashed. Alternatively, the heat-responsive material may be a chemical or composition which is normally an insulator and which becomes electrically conductive when heated by a flashing lamp, thereby making electrical connection to the next lamp to be flashed.

Light-responsive switch means can be employed instead of, and in a similar manner to, the above-described heat-responsive means. The light-responsive means can comprise a material which deforms in response to the bright light produced by a flashing lamp, or which is normally an insulator and becomes a conductor in response to the light of a flashing lamp. Alternatively, a light-responsive switch means can comprise a photocell, such as a light-sensitive diode, connected to actuate a switch such as a transistor or other semiconductor switch device.

The above-described flash-actuated switching circuits will function properly only if each flash lamp becomes an open circuit upon flashing, which normally is the case. However, if a lamp should become shorted upon flashing (due, for example, to stray or unburned metal particles bridging across the filament lead wires inside the lamp), then no further lamps of the array can be flashed because each succeeding firing pulse will be uselessly dissipated through the shorted lamp.

SUMMARY OF THE INVENTION

Objects of the invention are to provide an improved flash-actuated switching circuit for an array of photoflash lamps, and to provide such a circuit which will continue to function even though one or more of the lamps may become shorted upon flashing.

The invention comprises, briefly and in a preferred embodiment, a photoflash lamp array having a plurality of flash-actuated switches respectively associated with a plurality of flash lamps of the array, electrical terminal means adapted for connecting a first one of said plurality of lamps to a source of firing pulses, said flash-actuated switches being adapted, when the associated lamp is flashed, to connect a next lamp of the array to said electrical terminal means so as to be flashed by the next occurring firing pulse, and a plurality of resistors respectively interposed in series with said plurality of flash lamps for insuring flashing of succeeding lamps by said firing pulses in the event that one of said plurality of lamps becomes shorted upon flashing.

BRIEF DESCRIPTION OF THE DRAWING

The single FIGURE of the drawing is an electrical schematic circuit diagram of a preferred embodiment of the invention.

DESCRIPTION OF THE PREFERRED EMBODIMENT

A battery 11 is connected to charge a capacitor 12 through a resistor 13. In a preferred arrangement, the battery 11 has a voltage of approximately 10 volts, the capacitor 12 has a capacitance value of 1000 microfarads, and the resistor 13 has a resistance of 1000 ohms. One terminal of the capacitor 12 is connected to a connector terminal 14, and the other terminal of capacitor 12 is connected to a terminal 16 of a switch 17, the other terminal 18 thereof being connected to a second connector terminal 19. The switch 17 is adapted to be momentarily closed in synchronization with the opening of a camera shutter, in well-known manner. The circuit thus far described functions as a source of electrical energy pulses for firing photoflash lamps, and may be incorporated in a camera or in a flash attachment for use with a camera. Other firing pulse means can be used instead, such as a momentarily closing switch 17. Although the firing pulse is sometimes called a "voltage" pulse, it is primarily the energy of the pulse, comprising the combination of voltage, current, and time duration, that causes a lamp to flash.

A flash lamp array unit is provided with a pair of contact terminals 21 and 22 adapted for electrical engagement with the terminals 14 and 19, respectively. The photoflash array contains a plurality of photoflash lamps 26 through 30, which may be of conventional type such as General Electric type AG-1, each containing a filament provided with electrical connection lead wires and adapted for initiating a flash of combustible material contained within the bulb. One lead wire of each of the flash lamps is connected to the contact terminal 21.

A plurality of flash-actuated switches 31-34 are positioned near or otherwise associated with a plurality of flash lamps of the array. More specifically, a first switch 31 is associated with or positioned near the first lamp 26, as indicated by the arrow 36; a second switch 32 is associated with or positioned near the second lamp 27 as indicated by the arrow 37; a third switch 33 is positioned near or associated with the third lamp 28 as indicated by the arrow 38; and a fourth switch 34 is associated with or positioned near the fourth lamp 29 as indicated by the arrow 39. As will be apparent, there is no need for providing a switch associated with the last lamp 30 of the array.

A plurality of resistors 41–44 are connected in series with the plurality of lamps with which the switches 31–34 are associated. More specifically, a first resistor 41 is connected in series between the remaining lead wire of the first lamp 26 and the connector terminal 22; a second resistor 42 is connected between the remaining lead wire of the second lamp 27 and a normally open contact of the first flash-actuated switch 31; a third resistor 43 is connected between the remaining lead wire of the third lamp 28 and a normally open contact of the second flash-operated switch 32; and a fourth resistor 44 is connected between the remaining lead wire of the fourth lamp 29 and a normally open contact of the third flash-actuated switch 33. The remaining lead wire of the last lamp 30 is connected directly to a normally open contact of the last flash-actuated switch 34. The remaining contacts of the flash-actuated switches 31–34 are all connected to the contact terminal 22. Each of the resistors 41–44 preferably has a resistance value of approximately twice that of the filament of the lamp with which it is connected in series.

The flash-actuated switches 31–34 may comprise heat-responsive switches each having a pair of electrical contacts urged into contact with each other but held apart by a chemical or plastic material which melts or otherwise deforms when heated by the heat generated when the associated lamp flashes, so as to permit the contacts to close and electrically connect the next lamp in the array across the firing pulse terminals. Alternatively, the heat-responsive material may be a chemical or composition bridged between or encapsulating a pair of spaced-apart terminals and which is normally an insulator and becomes electrically conductive when heated by the associated flashing lamp, thereby forming an electrical connection to the next lamp to be flashed in the circuit. Alternatively, the flash-actuated switches 31–34 may comprise light-actuated switches of the types described above in connection with the background of the invention.

Initially, only the first flash lamp 26 is connected across the firing pulse terminals 21 and 22, via the series resistor 41, the remaining lamps being non-connected because of the normally open condition of the switches 31–34. Upon the occurrence of a first firing pulse, the pulse passes through the filament of the first lamp 26, causing it to flash, whereupon the heat or light of the flashing actuates the first flash-actuated switch 31, causing it to close and thus electrically connect the second lamp 27 across the firing pulse terminals 21 and 22, via the series resistor 42. The first firing pulse does not cause the second lamp 27 to flash, however, because by the time the switch 31 becomes actuated to connect the second lamp into the circuit, the first firing pulse has substantially become dissipated in the first lamp 26. The second firing pulse will be applied to the second lamp 27, via the series resistor 42 and closed switch 31, causing it to flash, and thus actuating the second flash-actuated switch 32. The procedure repeats, one lamp being flashed per firing pulse, until all of the lamps have been flashed.

Normally, each lamp becomes an open circuit upon flashing, whereupon all of the energy of the next succeeding firing pulse will be applied to the next lamp of the array. However, and in accordance with the invention, in the event that a lamp should become a closed circuit upon flashing, which can be caused by loose metal particles or unconsumed metal foil strands bridging across the filament lead wires within the lamp bulb, the next succeeding firing pulses will not be fully dissipated through the shorted lamp, but will be only partially dissipated, due to the resistor in series with the shorted lamp, leaving sufficient energy remaining in the firing pulses to successfully flash the remaining lamps of the array. More specifically, if the first lamp 26 should become shorted upon flashing, the next firing pulse, when it occurs, will have its energy approximately equally divided through the first lamp 26 and its series resistor 41, and through the second lamp 27 and its series resistor 42, which energy through the second lamp will be sufficient for causing it to flash. To insure reliable functioning of the circuit, the firing pulse energy preferably is greater than that required for flashing a single lamp, because of the fact, as stated above, that if a lamp should become shorted, subsequent firing pulse energies will be divided through the shorted lamp and the lamp being flashed. It is found that this increased value of firing pulse energy does not undesirably cause two lamps to be flashed by one firing pulse, due to the fact that the time required for each flash-actuated switch to close is sufficient so that each firing pulse is substantially fully dissipated in the lamp being flashed, prior to closing of a switch and connecting a next lamp across the firing pulse terminals. This is due to the fact that a flash-actuated switch cannot begin to function until the associated lamp flashes, and by that time the firing pulse energy is substantially fully dissipated in the lamp.

In the embodiment shown, the flash-actuated switches 31–34 are connected in common to one of the firing pulse terminals 22, thereby connecting successive lamps sequentially in parallel across the terminals 21 and 22. Alternatively, the normally open flash-actuated switches 31–34 could be connected successively in series with one another and between the various lamps of the array, thus connecting the successive lamps sequentially across the firing pulse terminals 21 and 22 through successively greater numbers of series connected flash-actuated switches.

In a practical embodiment of the invention, the flash lamps 26–30 are General Electric type AG-1 flash lamps, having cold resistance values of approximately 0.6 ohms, and each of the series resistors 41–44 has a resistance of approximately one ohm.

While a preferred embodiment of the invention has been shown and described, other embodiments and modifications thereof will become apparent to persons skilled in the art, and will fall within the scope of invention as defined in the following claims.

What I claim as new and desire to secure by Letters Patent of the United States is:

1. A photoflash lamp array having terminal means adapted for connection to a source of firing pulses and having a plurality of flash-actuated switches respectively associated with a plurality of flash lamps of the array and being responsive to the flashing of an associated lamp so as, when the associated lamp is flashed, to connect a next lamp of the array to said terminal means, wherein the improvement comprises a plurality of resistors respectively interposed in series with said plurality of flash lamps, said resistors having values of resistance so as to insure flashing of succeeding lamps by said firing pulses in the event that one of said plurality of lamps becomes shorted upon flashing.

2. A photoflash lamp array as claimed in claim 1, in which said flash-actuated switches are adapted to be actuated by heat produced by the flashing of the respective lamps with which they are associated.

3. A photoflash lamp array as claimed in claim 1, in which said flash-actuated switches are adapted to be actuated by light produced by the flashing of the respective lamps with which they are associated.

4. A photoflash lamp array as claimed in claim 1, in which each of said resistors has a resistance value of about twice that of the filament of the lamp with which it is interposed in series.

5. A photoflash lamp array as claimed in claim 4, in which each of said plurality of flash lamps has a filament resistance of approximately 0.6 ohms and each of said plurality of resistors has a resistance of approximately 1 ohm.

6. A photoflash lamp array having terminal means adapted for connection to a source of firing pulses and having a plurality of flash lamps including a first flash lamp and a second flash lamp, wherein the improvement comprises a resistor connected in series combination with said first lamp, means for connecting said series combination to said terminal means, and a flash-actuated switch adapted to become conductive and connect said second lamp to said terminal means when said first lamp is flashed, said resistor having a value of resistance so as to insure flashing of said second lamp by a firing pulse in the event that said first lamp becomes shorted upon flashing.

7. A photoflash lamp array as claimed in claim 6, in which said flash-actuated switch is adapted to be actuated by heat produced by said flashing of the first lamp.

8. A photoflash lamp array as claimed in claim 6, in which said flash-actuated switch is adapted to be actuated by light produced by said flashing of the first lamp.

9. A photoflash lamp array as claimed in claim 6, in which said resistor has a resistance value of about twice that of the filament of said first lamp.

10. A photoflash lamp array as claimed in claim 9, in which said first flash lamp has a filament resistance of approximately 0.6 ohms and said resistor has a resistance of approximately 1 ohm.

* * * * *